(No Model.)
W. H. DE WITT.
BICYCLE.
No. 478,415. Patented July 5, 1892.
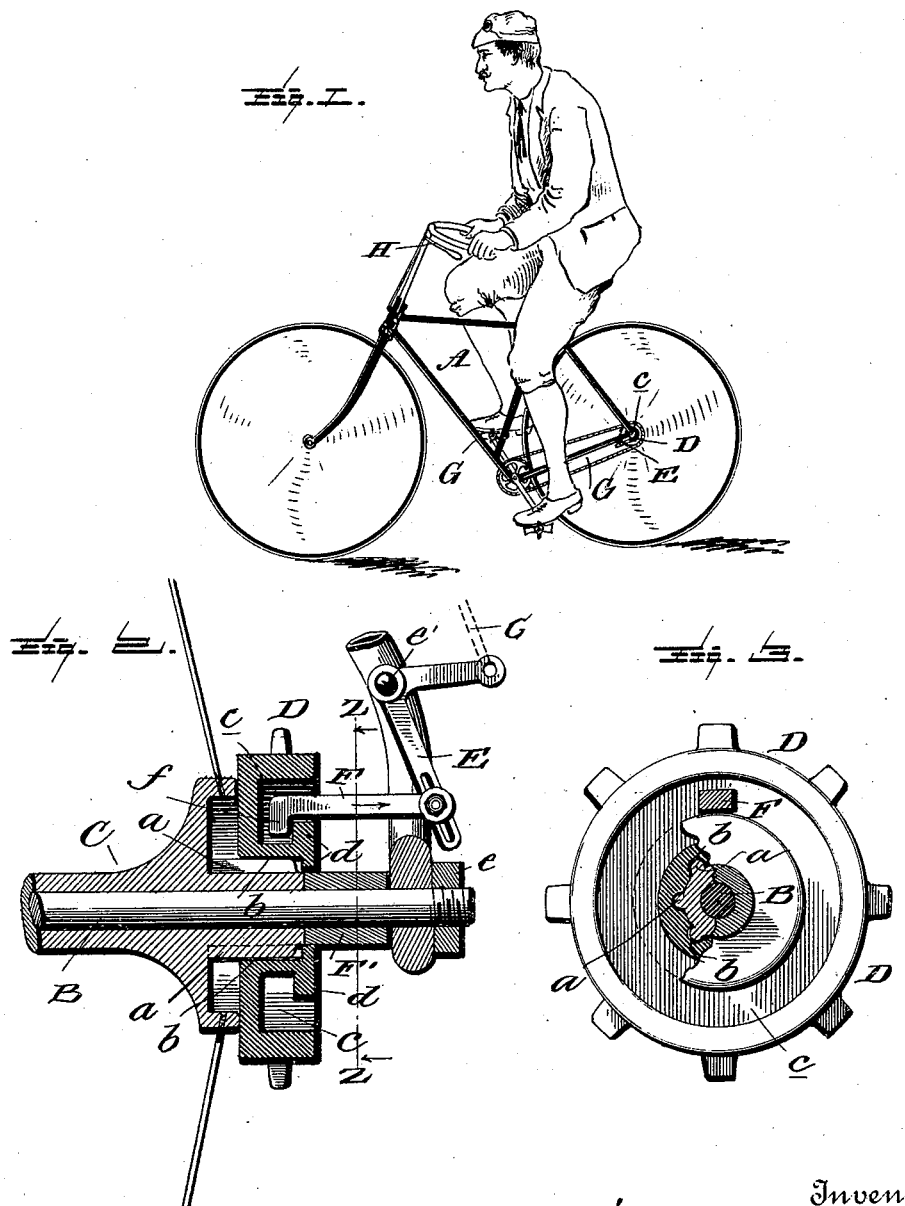
Witnesses
L. C. Hills.
E. H. Bond.
Inventor
William H. DeWitt.
per Chas. H. Fowler
Attorney

UNITED STATES PATENT OFFICE.

WILLIAM H. DE WITT, OF WILKES-BARRÉ, PENNSYLVANIA.

BICYCLE.

SPECIFICATION forming part of Letters Patent No. 478,415, dated July 5, 1892.

Application filed October 31, 1891. Serial No. 410,414. (No model.)

*To all whom it may concern:*

Be it known that I, WILLIAM H. DE WITT, a citizen of the United States, residing at Wilkes-Barré, in the county of Luzerne and State of Pennsylvania, have invented certain new and useful Improvements in Bicycles; and I do hereby declare that the following is a full, clear, and exact description of the same, reference being had to the annexed drawings, making a part of this specification, and to the letters of reference marked thereon.

This invention relates to certain new and useful improvements in bicycles; and it has for its object, primarily, to provide simple and efficient means for actuating certain parts for the purpose of allowing the rider to throw the sprocket wheel or wheels out of gear, so that the pedals will not revolve when coasting, thus saving the wear, as well as accidents, which are liable to happen when coasting downhill with the pedals and cranks revolving all the time. By preventing motion of the pedals they may form a rest for the feet of the rider while coasting, and the rider may throw the parts into gear with his feet still on the pedals.

Improved means are provided for accomplishing the desired end.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, in which—

Figure 1 is a perspective view of a vehicle or bicycle provided with the improvement. Fig. 2 is an enlarged sectional detail of the hub and axle and sprocket-wheel. Fig. 3 is a section on the line $z\ z$ of Fig. 2 with parts broken away.

Like letters of reference indicate like parts throughout all the views.

Referring now to the details of the drawings by letter, A designates a bicycle, which is shown as of the Safety style and which may be of any of the well-known or approved forms, except as hereinafter specified.

B is the axle, and C a bearing or sleeve thereon, forming the hub of the wheel, to which the spokes are secured in any suitable manner. The central portion of this bearing or hub is ribbed or otherwise formed, as shown at $a$, and on this ribbed portion is adapted to be sleeved the hub of the sprocket-wheel D, which is provided with channels or grooves $b$, corresponding to the said ribs, as seen best in Fig. 3, so that when the parts are engaged the sprocket-wheel and hub or wheel will revolve together, as will be readily understood from Fig. 3. The hub of the sprocket-wheel is formed with an annular chamber or recess $c$, with a shoulder $d$, as seen in Fig. 2, for a purpose which will soon be explained.

The axle B receives the ends of the rear portion of the frame of the machine, and between the said ends and the hub of the wheel there is arranged a sleeve F', as seen in Fig. 2. The ends of the axle are provided with adjusting-nuts $e$, by which the parts may be tightened when desired.

E is a bell-crank lever pivoted at its elbow, as at $e'$, to the rear portion of the frame, and to one end is adjustably connected the arm F, which has its free end hooked or turned at right angles to its length, as shown at $f$ in Fig. 2, and which works in the chamber of the hub of the sprocket-wheel, the shoulder $d$ serving to prevent its displacement and still permit the sprocket-wheel to revolve without interference by the said arm. The other end or arm of the bell-crank lever is connected, as by the rod G and any suitable pivotal connections, with a hand-lever H, arranged within convenient reach of the rider on the seat.

The operation will be readily understood from the above description, when taken in connection with the annexed drawings. When the machine is being driven, the parts are in the position in which they are shown in Fig. 2, with the hub of the sprocket-wheel engaged with the ribs on the hub of the wheel, so as to revolve therewith. When it is desired to coast, all that is necessary for the rider to do is to pull upon the hand-lever, which moves the bell-crank lever on its pivot, and, pulling the arm F in the direction of the arrow in Fig. 2, pulls the hub of the sprocket-wheel out onto the sleeve F' and out of engagement with the ribs of the wheel, so that it will no longer revolve therewith, as will be readily understood. The cranks and pedals will then remain stationary and may be used for rests for the feet in coasting. When the end of the incline is reached or it is desired to again propel the machine, the parts are restored to their normal position, when the sprocket-wheel and the wheel move together in the usual manner.

With slight changes of the pivotal connections between the bell-crank lever and the hand-lever the forward sprocket-wheel may be actuated instead of the rear, as shown.

What is claimed as new is—

1. In a bicycle, the combination, with the axle and wheel, the latter having ribbed hub, of a sprocket-wheel having a hub with grooves and means for moving the sprocket-wheel on its axle, as set forth.

2. The combination, with the axle and the wheel having ribbed hub, of the sprocket-wheel having grooved hub and annular chamber, the bell-crank lever, the arm connected therewith and working in said chamber, and means for actuating the bell-crank lever, as and for the purpose specified.

3. In a bicycle, the combination, with the ribbed hub and wheel and axle, of the sprocket-wheel having grooved hub, the bell-crank lever, the hooked arm adjustably connected therewith, the hand-lever, and pivotal connections between the hand and bell-crank levers, substantially as specified.

In testimony that I claim the above I have hereunto subscribed my name in the presence of two witnesses.

WILLIAM H. DE WITT.

Witnesses:
W. W. NEUER, Jr.,
ROBT. J. BLAIR.